United States Patent
Hartmann (10) Patent No.: US 6,192,779 B1
(45) Date of Patent: Feb. 27, 2001

(54) VERTICALLY-OPERATING BREAD-SLICING MACHINE WITH AN OILING DEVICE

(75) Inventor: Johannes Hartmann, Delbrück (DE)

(73) Assignee: Georg Hartmann Maschinenbau GmbH, Delbrück (DE)

( * ) Notice: Subject to any disclaimer, the term of this patent is extended or adjusted under 35 U.S.C. 154(b) by 0 days.

(21) Appl. No.: 09/202,061

(22) PCT Filed: Mar. 28, 1998

(86) PCT No.: PCT/EP98/01835

§ 371 Date: Oct. 21, 1999

§ 102(e) Date: Oct. 21, 1999

(87) PCT Pub. No.: WO98/45096

PCT Pub. Date: Oct. 15, 1998

(30) Foreign Application Priority Data

Apr. 8, 1997 (DE) .............................. 197 14 329

(51) Int. Cl.[7] .................................................. B26D 7/08
(52) U.S. Cl. ................... 83/169; 83/101; 83/168; 83/932; 451/296
(58) Field of Search .................. 83/168, 169, 932, 83/101, 22, 24; 451/53, 296, 449

(56) References Cited

U.S. PATENT DOCUMENTS

| | | | |
|---|---|---|---|
| 2,126,987 | * 8/1938 | Criner | 83/168 |
| 2,293,083 | * 8/1942 | Schlemmer | 83/168 |
| 3,638,521 | * 2/1972 | Marckx et al. | 83/169 |
| 3,673,903 | * 7/1972 | Evans | 83/168 |
| 3,754,490 | * 8/1973 | Sata et al. | 83/168 |
| 4,366,736 | * 1/1983 | Oosaki | 83/168 |
| 4,372,185 | 2/1983 | Pila . | |
| 4,574,817 | * 3/1986 | Suzuki et al. | 83/168 |
| 4,805,500 | * 2/1989 | Saito et al. | 83/168 |
| 5,666,869 | * 9/1997 | Sakamoto et al. | 83/169 |
| 5,746,105 | * 5/1998 | Suzuki et al. | 83/804 |

FOREIGN PATENT DOCUMENTS 296 02 579  5/1996  (DE) .
0 406 019   1/1991  (EP) .

* cited by examiner

*Primary Examiner*—M. Rachuba
*Assistant Examiner*—Sean Pryor
(74) *Attorney, Agent, or Firm*—Browdy and Neimark (57) ABSTRACT

The invention relates to a lubrication device in a vertically functioning bread slicer having several blade bands (3), next to each other and a predetermined width of bread slice apart, continuously circulating crosswise around blade band rollers (2). Both sides of the blade bands (3) have a horizontal lubricating roller (6, 7) with an oil-impregnated felt envelope (63, 73) which lubricates the cutting surfaces (30) of the blade bands (3). At least one of the two lubricating rollers (6, 7) can pivot around a horizontal pivoting axis (6S) to a position (P1) a distance apart from the blade bands (3), the two lubrication rollers (6, 7) can each be displaced by a given length (A) lengthwise along the rollers (L) in relation to the band blades (3).

19 Claims, 9 Drawing Sheets

VERTICALLY-OPERATING BREAD-SLICING MACHINE WITH AN OILING DEVICE

BACKGROUND OF THE INVENTION

1. Technical Field of the Invention

The invention relates to an oiling device in a vertically-operating bread-slicing machine, having a plurality of adjacent cutting belts that circulate endlessly, and crossed, with spacing by predetermined bread thicknesses, around two cutting-belt rollers, and having a horizontal oiling roller that employs an oil-soaked felt jacket to oil the blade surfaces of the cutting belts on both sides of the cutting belts.

2. Prior Art

Generally, known oiling systems for bread-slicing machines employ spray oiling or contact oiling. In spray oiling, the oiling fluid is sprayed onto the cutting belts by means of feed nozzles disposed in the housing of the bread-slicing machine. In this method, the oiling fluid is sprayed in excess to assure a virtually complete wetting of the blade surfaces. The excessive quantity of oiling fluid drips from the top surfaces of the cutting belts, but a portion of the oiling fluid is carried along by the rapidly-circulating cutting belts, so the inside walls of the housing are disadvantageously dirtied by airborne fluid. A further disadvantage of spray oiling is that it requires a large quantity of oiling fluid, and the excessive applied oiling fluid must be disposed of. The method is thus distinguished by a poor cost-effectiveness ratio.

Contact oiling of the cutting belts with the aid of oiling rollers disposed on both sides of the cutting belts is improved over spray oiling with respect to the required quantity of oiling fluid and the attained result. In contact oiling with the aid of oiling rollers, the oiling fluid is introduced into the interior of the oiling roller via oil lines connected to the oiling roller and, due to the centrifugal force in the oiling rollers, which rotate when they come into contact with the cutting belts, the fluid is supplied to the outer felt jacket through holes distributed on the surface. The holes all have the same diameter, and are uniformly spaced from one another. Unfortunately, this leads to excessive soaking of the felt jacket. The oiling rollers are stationary, so the same locations of the felt jacket are always stressed during the oiling process. After a time, the felt jacket no longer possesses its originally-smooth surface; the cutting belts cut tracks into the surface. Therefore, the felt jackets have a short service life and must be replaced at regular, short intervals. Furthermore, the tracks lead to uneven oiling because, during the oiling process, the felt jackets of the two oiling rollers run onto one another at the sections adjacent to the tracks and, due to the pressing pressure of the oiling rollers against one another, the oiling fluid is pressed out and expelled. The circulating cutting belts convey the excess, expelled oiling fluid, thereby dirtying the interior of the bread-slicing machine. This also significantly increases oiling fluid consumption.

OBJECT AND SUMMARY OF THE INVENTION

It is therefore an object of the invention to improve an oiling device of this type, having two oiling rollers encased by felt jackets, such that the felt jackets are uniformly stressed in contact oiling, which significantly extends the service life of the felt jackets.

It is a further object of the invention to disclose an oiling device with which the oiling fluid is uniformly applied to the blade surfaces of the cutting belts circulating in the bread-slicing machine, so the device has a lower oiling fluid consumption.

In accordance with the invention, the first object is accomplished in that at least one of the two oiling rollers can pivot about a horizontal pivoting shaft into a spaced position at a distance from the cutting belts, and, in the spaced position with respect to the cutting belts, the two oiling rollers are displaceable with respect to the cutting belts by a defined segment in the longitudinal direction of the rollers. During bread slicing, the oiling process for the blade surfaces of the cutting belts, which will be described in detail below, is repeated periodically by means of oiling rollers.

In an oiling process, the pivotable oiling roller pivots about the horizontal pivoting shaft from its spaced position with respect to the cutting belts, as its initial position, into an oiling position, where it remains briefly. In the oiling position, the two oiling rollers lie closely against the blade surfaces of the cutting belts respectively facing them, and the blade surfaces are wetted with the oiling fluid in a contact-oiling process, because the contacted cutting belts drive the oiling rollers due to frictional lockup. The pivotable oiling roller is subsequently pivoted back into its spaced position, so the two oiling rollers are spaced from the cutting belts. Now the two oiling rollers are displaced, with respect to the cutting belts, in the longitudinal roller direction into an end position, as the new initial position for the next oiling process, which is axially offset with respect to the original initial position. The two oiling rollers are displaced either in the same direction or in opposite directions. If the oiling rollers are displaced in the same direction, they are preferably coupled to one another, so only one displacement cylinder is required for the displacement.

It is further advantageous if the oiling rollers execute a pendulum movement in the axial direction in consecutive oiling processes, that is, the rollers are alternatingly displaced back and forth between their initial position and the end position. This effects uniform utilization of the felt jackets. No tracks are cut into the felt jackets, which consistently attains reliable wetting of the cutting belts.

In a particularly-preferred embodiment, a horizontally-oriented rectifying shaft is disposed downstream of the pivotable oiling roller on the return side. In the oiling position of the oiling rollers, the rectifying shaft orients the cutting belts flat with respect to the oiling rollers, and the blade surfaces of the cutting belts consequently lie flat on the felt jackets. This also advantageously prevents the blades of the cutting belts from damaging the felt rollers.

In the embodiment of the hollow shaft according to the invention, the number of discharge bores decreases from the center of the shaft to the ends of the shaft, with the discharge bores in the center of the shaft being disposed opposite one another in pairs and only being disposed alternatingly toward the outside, so the distance between two adjacent bores increases from the center to the ends of the shaft. Furthermore, the diameter of the discharge bores of the hollow shaft preferably decreases from the center toward the outside.

The oiling rollers with the hollow shaft and the hollow cylinder are oriented such that the discharge bores lie horizontally, thus attaining a continuous draining of the oiling fluid.

During the oiling process, the oiling fluid is supplied via oil lines connected to the two ends of the hollow shaft, and is uniformly discharged onto the felt jacket via the discharge bores, with only the necessary quantity of oiling fluid being metered, so no excess occurs. Overall, the oil consumption is considerably reduced in comparison to the known oiling method.

With the arrangement of the discharge bores on the hollow shaft and the reduction in the diameter from the center toward the outside, the oiling fluid is purposefully directed into the region on the felt jacket where the most heavily-used cutting belts are disposed.

In addition, a particularly-preferred embodiment of the invention includes an oiling roller whose hollow cylinder has distributer bores, which are uniformly distributed over the cross section of the cylinder and through which the oiling fluid is conveyed outward and transferred to the felt jacket encasing the hollow cylinder, so the jacket is soaked with the oiling fluid. It is particularly beneficial to dispose the distributor bores on helical lines extending on the jacket of the hollow cylinder, with the distributor bores being uniformly spaced from one another or, toward the outside, further from one another. The pitch height of the helical line is dimensioned such that the felt jacket is uniformly saturated with the oiling fluid, and the entire quantity of oiling fluid is consumed without an excess occurring.

If numerous helical lines are provided, they are wound opposite one another, i.e., a portion of the helical lines ascend in the direction of rotation of the oiling roller, and the others ascend counter to the direction of rotation.

This type of embodiment of the oiling roller, which has a multi-layered design in the radial direction including an inside hollow shaft, a hollow cylinder seated thereupon so as to rotate, and a felt tube on the outside as a felt jacket, effects uniform wetting of the cutting belts with the oiling fluid.

In a preferred embodiment, in a bread-slicing machine, an oiling device is respectively disposed with minimal spacing from the cutting-belt rollers on the return side, so the circulating cutting belts are oiled each time before they cut into the bread. This dual oiling facilitates the slicing process.

BRIEF DESCRIPTION OF THE DRAWINGS

The invention is described in detail by way of a preferred embodiment illustrated in the figures. Shown are in:

FIG. 2b a plan view of the oiling roller that is displaced in the longitudinal direction of the roller with respect to FIG. 2a;

FIG. 3a a detailed view of the displacement cylinder with the oiling roller in the position according to FIG. 2a;

FIG. 4 a section through the oiling roller according to line A:A in FIG. 2a;

DETAILED DESCRIPTION OF THE PREFERRED EMBODIMENTS OF THE INVENTION

Figure 1A:
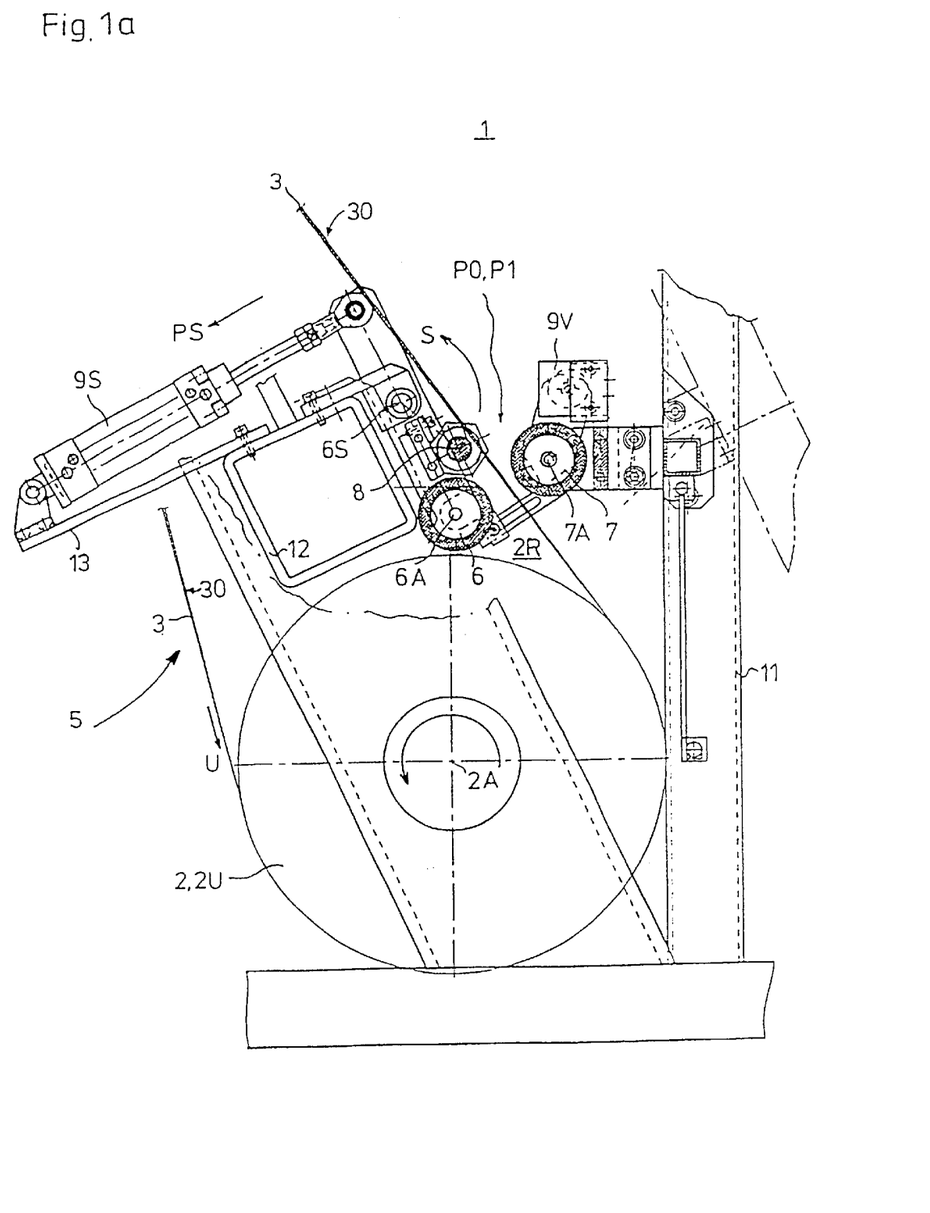
FIG. 1a sectional side view of the oiling device with the oiling rollers in the spaced position.
Figure 1B:
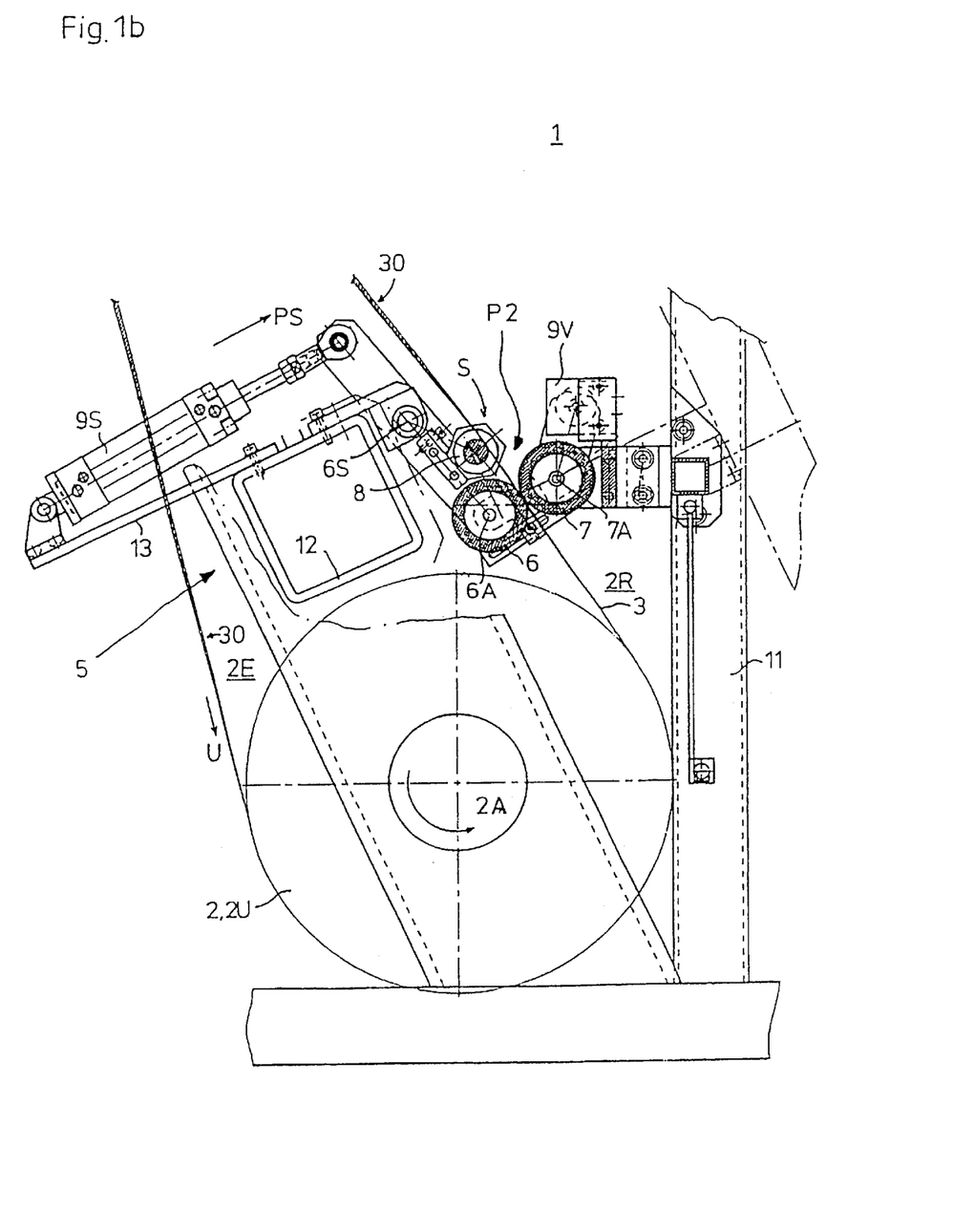
FIG. 1b a sectional side view of the oiling device with the oiling rollers in the oiling position.

FIGS. 1a and 1b show a vertically-operating bread-slicing machine (1) having a built-in oiling device (5). In the bread-slicing machine (1), two horizontal cuttingbelt rollers (2,2U) are disposed diagonally one beneath the other, with the lower cutting-belt roller (2U) being motor-driven and the upper cutting-belt roller serving merely to divert. A plurality of cutting belts (3) spaced from one another by predetermined bread-slice thicknesses run endlessly and cross on the cutting-belt rollers (2,2U) On the intake side, a bread supplier for uncut bread is inclined in the direction of the crossing points of the runs of the cutting belts (3), because the blade surfaces (30) of the cutting belts (3) are perpendicular to the shafts (2A) of the cutting-belt rollers (2,2U) in this region, as a cutting region, and the blades of the cutting belts (3) are oriented toward the bread supplier. The cutting belts (3) are inclined by 90° while circulating, so the intake and return (2E, 2R) of the cutting-belt rollers extend virtually parallel to the shaft (2A) of the cutting-belt roller (2). Then one of the two blade surfaces (30) of the cutting belts (3) lies level or flat on the cutting-belt rollers (2).

The oiling device (5), with its horizontal oiling roller (6, 7) that oils a respective blade surface (30) facing one of the two sides of the cutting belts (3), and a felt jacket (63, 73), is disposed on the return side of the lower cutting-belt roller (2U), with the cutting belts (3) circulating in the gap between the oiling rollers (6, 7). The spacing between the oiling device (5) and the lower cutting-belt roller (2U) is minimal, because then the cutting belts (3) extend nearly parallel to the axis of the oiling rollers (6, 7). To position the cutting belts (3) level on the oiling rollers (6, 7), a horizontal, steel rectifying shaft (8) is disposed downstream of the oiling rollers on the return side, the shaft serving to compensate the present inclination of the cutting belts (3) with respect to the shafts (6A, 7A) of the oiling rollers (6, 7).

The shafts (6A, 7A) of the oiling rollers (6, 7) lie in a plane that is virtually perpendicular to the flat cutting belts (3), because then the pressing pressure exerted by the oiling rollers (6, 7) during oiling increases, and the cutting belts (3) are thus not additionally stressed. The lower oiling roller (6) associated with the inside blade surfaces (30) of the cutting belts (3) can pivot, with respect to the upper oiling roller (7) associated with the upper, outside blade surfaces (30) of the cutting belts (3), about a horizontal pivoting shaft (6S); in contrast, the upper oiling roller (7) is stationary. The two oiling rollers (6, 7) are seated to be displaced in the longitudinal direction (L) of the rollers.

In a bread-slicing machine (1) that is not shown entirely, two oiling devices (5) are used to oil the cutting belts (3), so even difficult-to-slice items can be sliced satisfactorily. In this case, one oiling device (5) is associated with the lower cutting-belt-roller (2U), as described above. The other oiling device is likewise secured on the return side at the upper cutting-belt roller (22).

The circulating cutting belts (3) are oiled twice with the aid of two oiling devices (5), with the oiling fluid being applied to the blade surfaces of the cutting belts (3) prior to each cut into the bread.

The oiling device (5) can be completely disassembled into its individual parts, because the connections between the components are detachable. Maintenance and cleaning work can therefore be performed quickly and simply.

FIG. 1a shows the oiling device (5) in the spaced position (PO), in which the oiling rollers (6, 7) and the rectifying shaft (8) are spaced from the cutting belts (3), and the cutting belts (3) run contactless in the gap between the oiling rollers (6, 7).

FIG. 1b illustrates the oiling position (P2) of the oiling device (5), in which the oiling rollers (6, 7) rest against the blade surfaces (30) of the cutting belts (3) in order to oil them, and the cutting belts (3) run over the rectifying shaft (8). In comparison to FIG. 1a, the cutting belts (3) are subjected to additional tension by rectifying shaft (8).

During bread slicing, the oiling process of the blade surfaces (30) of the cutting belts (3) by means of oiling rollers (6, 7) is repeated periodically, with the lower, pivotable oiling roller (6) briefly being pivoted from its spaced position (PO) (FIG. 1a) with respect to the cutting belts (3), as its initial position (P1), about the horizontal pivoting shaft (6S) into an oiling position (P2) (FIG. 1b). At the same time that the pivoting process is taking place, an oiling-fluid conveying pump is activated, and transports the oiling fluid into the hollow shafts (61, 71) of the oiling rollers (6, 7). There the two oiling rollers (6, 7) lie closely against the blade surfaces (30) of the cutting belts (3) that face the respective oiling rollers. The circulating cutting belts (3) cause the two oiling rollers (6, 7) to co-rotate in the circulation direction (U). Then the oiling fluid is conveyed radially from the inside toward the outside due to the centrifugal force in the oiling rollers (6, 7), the felt jacket (63, 73) is soaked, and the blade surfaces (30) of the cutting belts (3) in contact with the oiling rollers are oiled. Then the lower oiling roller (6) pivots back into the spaced position (P0), and the oilingfluid conveyor pump is shut off. Finally, the two oiling rollers (6, 7) are displaced, with respect to the cutting belts (3), in the longitudinal direction (L) of the rollers into an end position (P3), as the new initial position (P1), which is axially offset with respect to the original initial position (P1). In consecutive oiling processes, the oiling rollers (6, 7) are displaced from the initial position (P1) into the end position (P3), and from this end position (P3), as the new initial position (P1), back into the original initial position (P1). The length of displacement (A) preferably corresponds to the width of the blade surface (30) of a cutting belt (3), so the felt jackets (63, 73) are uniformly stressed.

The pivoting device (9S) for pivoting the lower oiling roller (6), and the pivoting process (PS), are described in detail below in connection with FIGS. 5 and 6. The displacement device (9V) for displacing the lower and upper oiling rollers (6, 7), and the displacement process (PV), are explained in detail with reference to FIGS. 2a through 3b.

Figure 2A:
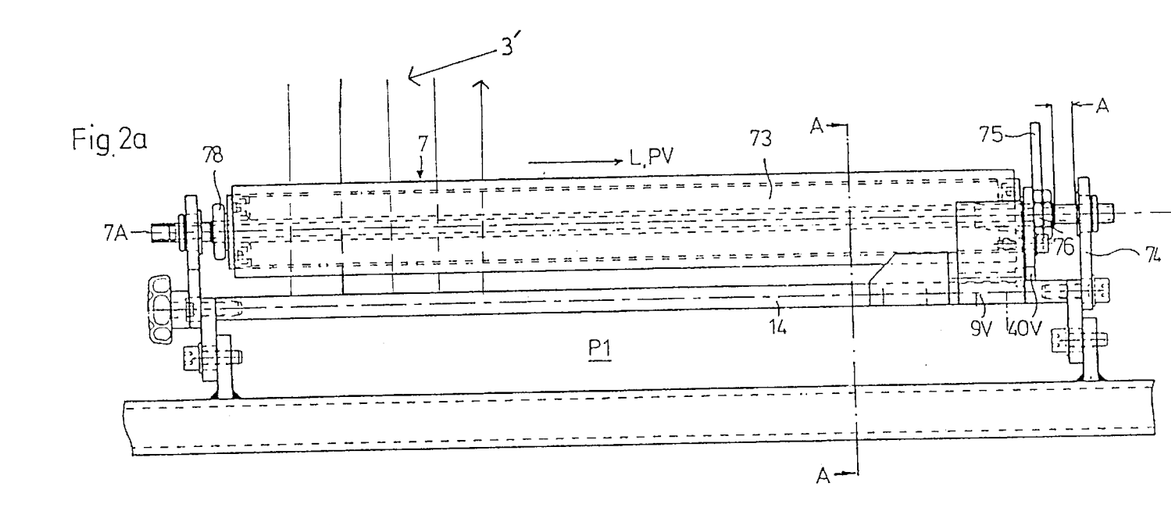
FIG. 2a a plan view of the oiling roller that is horizontally secured opposite the pivotable oiling roller.
Figure 2B:
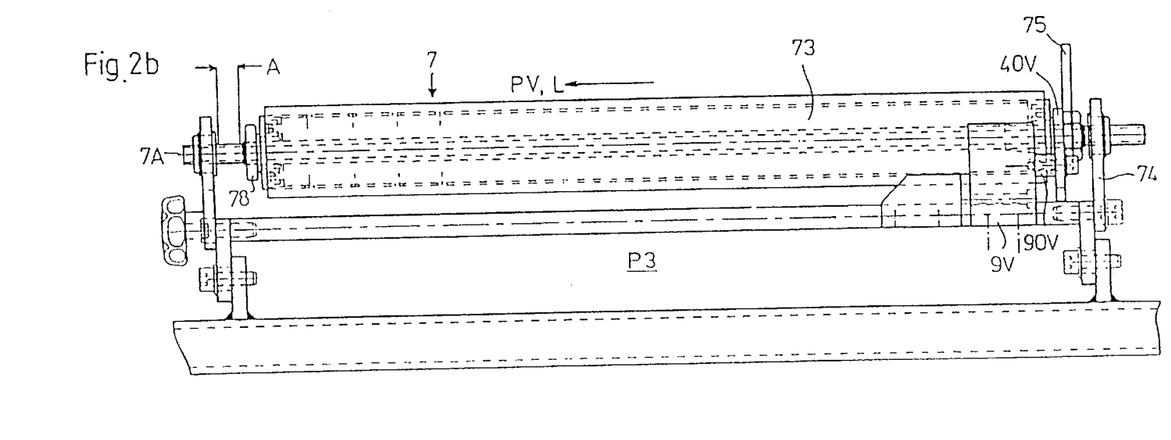
Figure 3A:
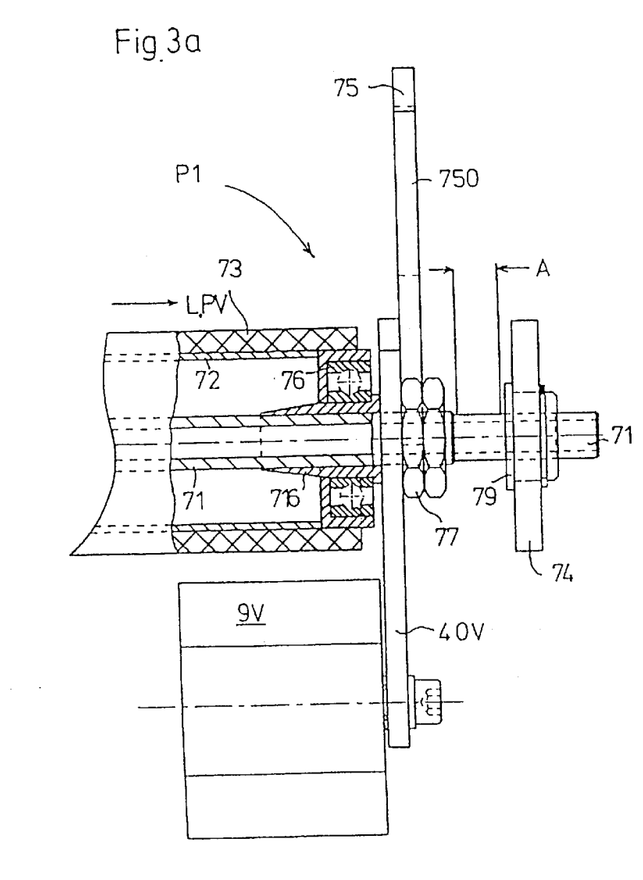
Figure 3B:
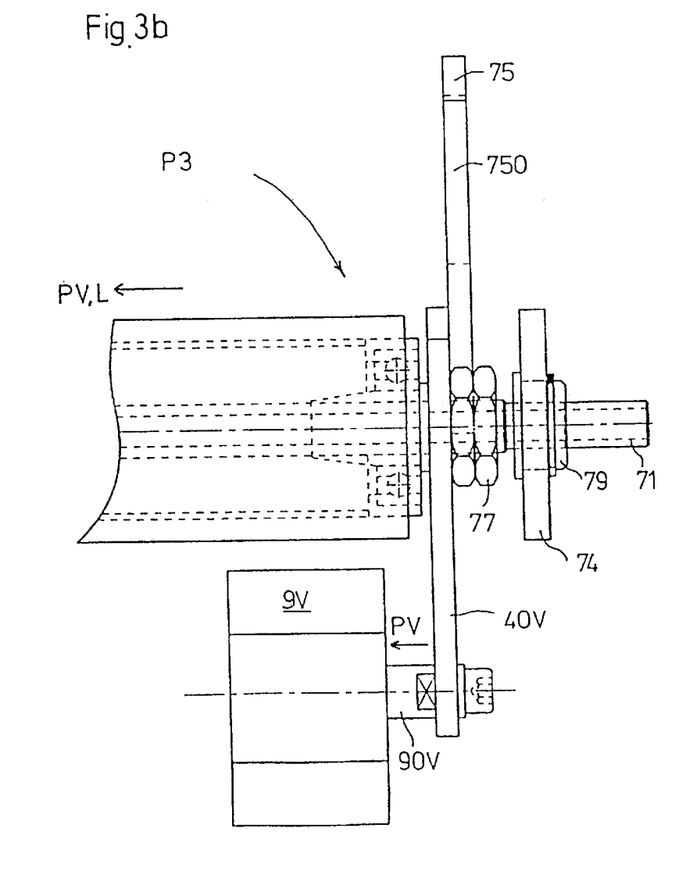
FIG. 3b a detailed view of the displacement cylinder with the oiling roller in the position according to FIG. 2b.

FIGS. 2a through 4 show the upper oiling roller (7), which is stationary with respect to the pivoting shaft (6S); the upper oiling roller (7) assumes the initial position (P1) shown in FIGS. 2a and 3a, and, in FIGS. 2b and 3b, the end position (P3), which is axially offset with respect to the initial position (P1). In both positions (P1, P3), the upper oiling roller (7) is spaced from the cutting belts (3), because the axial displacement process (PV) can only be effected in the spaced position (P0).

Figure 7:
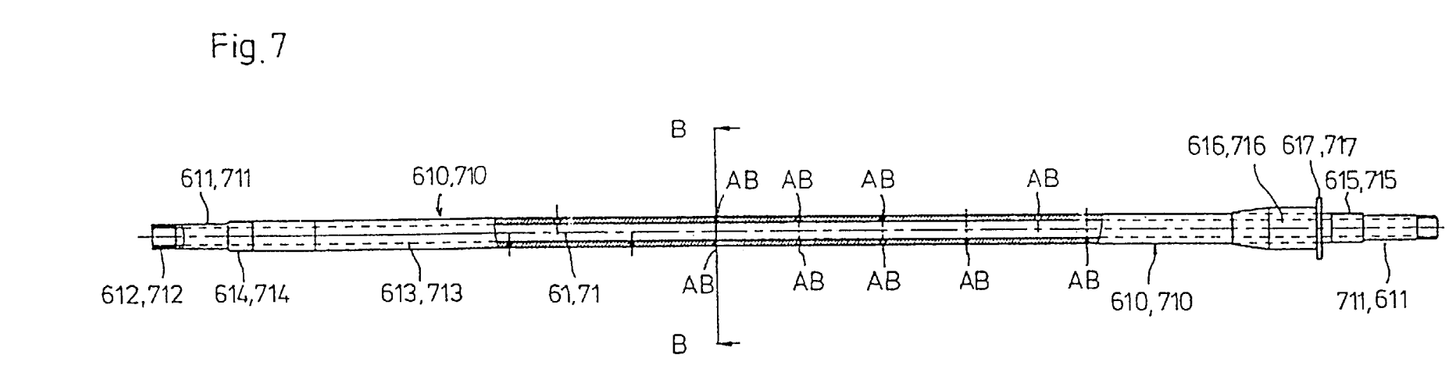
FIG. 7 a detailed representation of a hollow shaft of the oiling roller.
Figure 9:
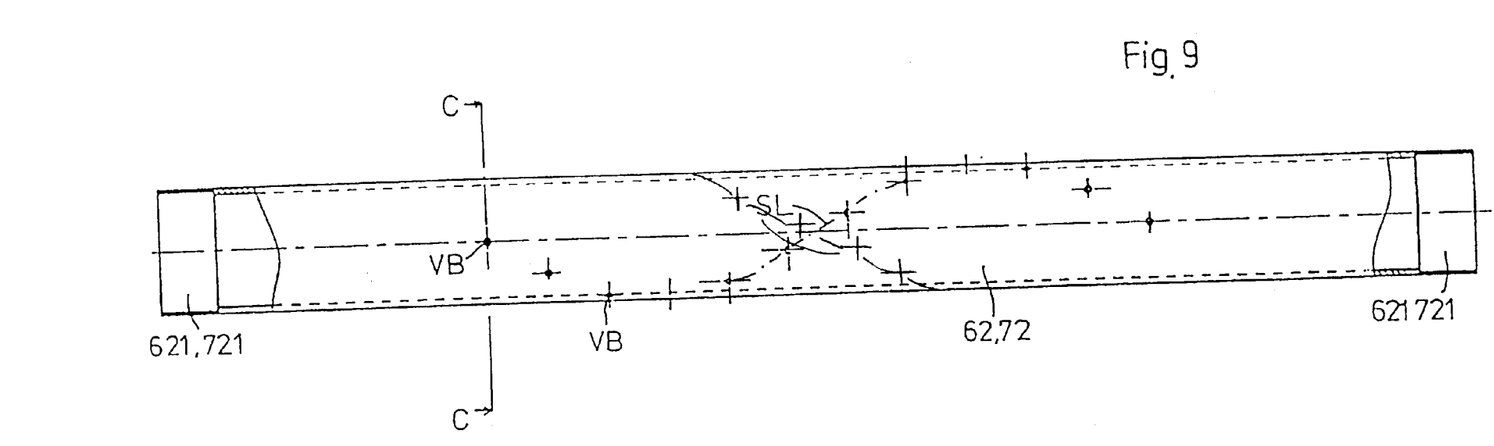
FIG. 9 a detailed representation of a hollow cylinder of the oiling roller.

The upper oiling roller (7) can also be disassembled into its individual parts, as can be seen from the aforementioned figures when viewed with FIGS. 7 and 9.

The oiling roller (7) has a multi-layered design; in the radial direction, the roller comprises, from the inside toward the outside, a hollow shaft (71) (FIG. 7), and a hollow cylinder (72) (FIG. 9) that is seated thereupon so as to rotate and has a felt tube (73) placed over it as a felt jacket. The shaft ends of the hollow shaft (71) extend through a bearing arm (74) extending perpendicular to the shaft (6A), so the hollow shaft (71), and thus the oiling roller (7), can be displaced in plain-bearing bushes (79) in the longitudinal direction (L) of the rollers. The spacing between the bearing arms (74) is dimensioned such that the oiling rollers (6, 7) can be moved, with respect to the cutting belts (3), by at least length (A) corresponding to the width of a cutting belt (3). The bearing arms (74) are detachably connected with a fastening plate (14), to which a displacement cylinder (9V) is also secured as a displacement device (9V), the cylinder having a piston rod (90V) that can travel in the longitudinal direction (L) of the rollers.

Figure 4:
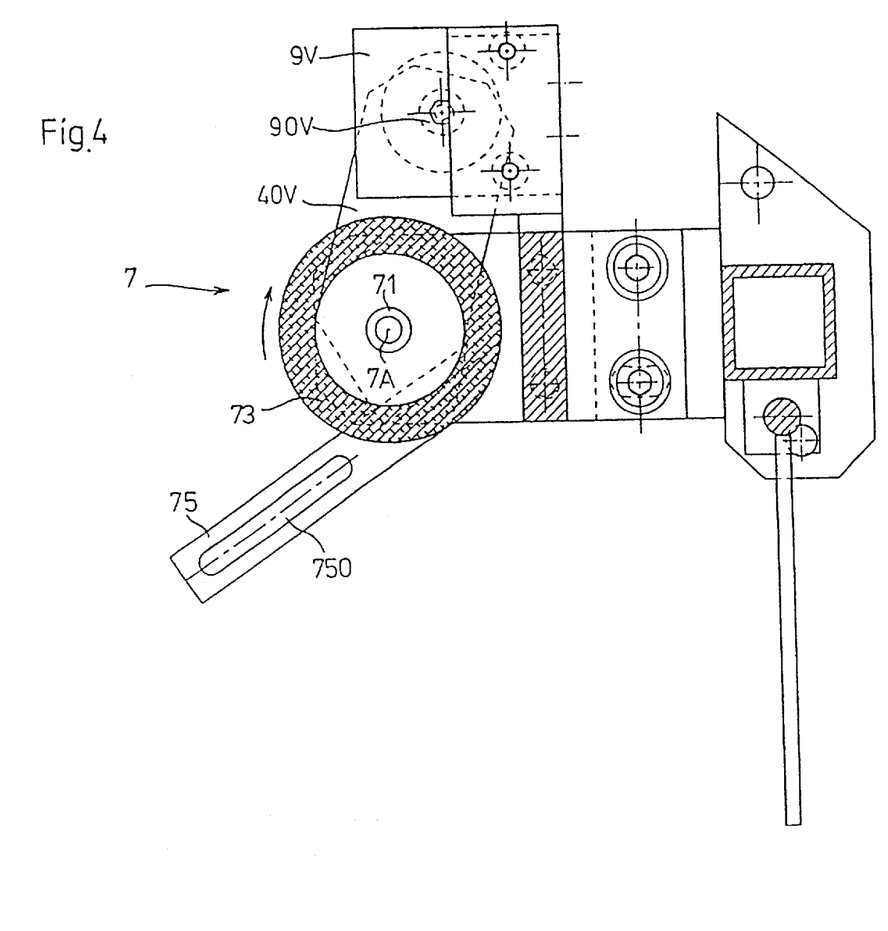

The hollow cylinder (72) for seating the oiling roller (7) has at the end a shoulder (721), which is cut into the inside of the tube, for receiving a deep-groove ball bearing (76), so the hollow cylinder (72) rotates in the oiling position (P2). The one tube end of the hollow cylinder (72) is secured against axial movements by a knurled nut (78), and the opposite tube end is secured against axial movements by counternuts (77). At one of the two end faces, preferably at the tube end secured by the counternut (77), a carrier (40V), which cooperates with the displacement cylinder (9V), is disposed on the hollow shaft (71), between the hollow cylinder (72) and the counternuts, as is a tab (75) having an oblong hole (750) as a first connecting member (75) with the other oiling roller (6).

The displacement cylinder (9V), particularly a short-stroke cylinder, has the task of moving the stationary oiling roller (7) and the pivotable oiling roller (6) connected by way of a fork-tab connection (65, 75) back and forth between the initial position (P1)—FIGS. 2a and 3a—and the end position (P3)—FIGS. 2b and 3b—during bread slicing. During the displacement process (PV), the piston rod (90) of the displacement cylinder (9V) moves in the longitudinal direction (L) of the rollers, and the carrier (40V) secured to the piston rod (90V) and the hollow shaft (71) moves the two oiling rollers (6, 7) into their end position (P3) as the new initial position (P1) for the next oiling process.

Figure 5:
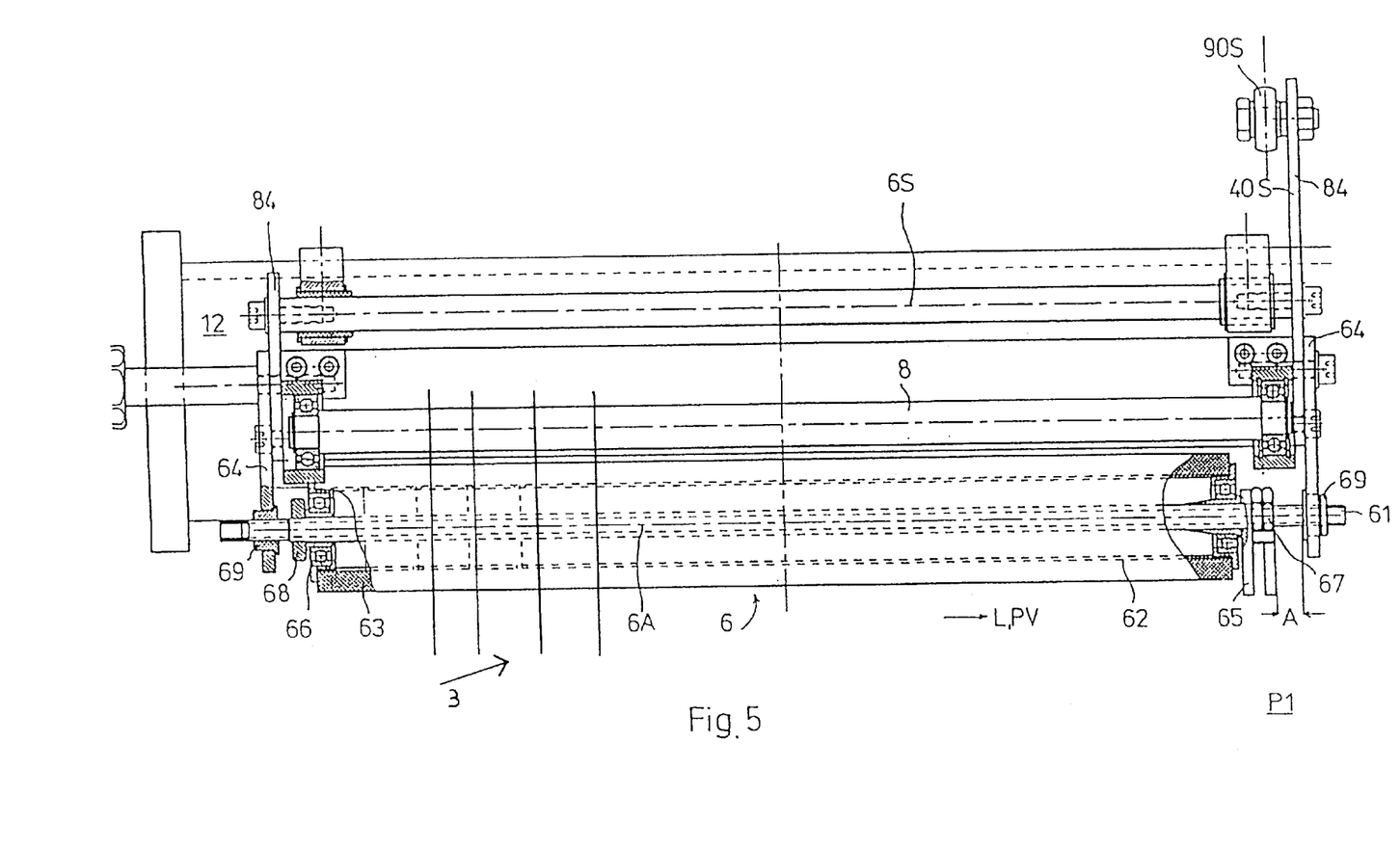
FIG. 5 a plan view of the pivotable oiling roller.
Figure 6:
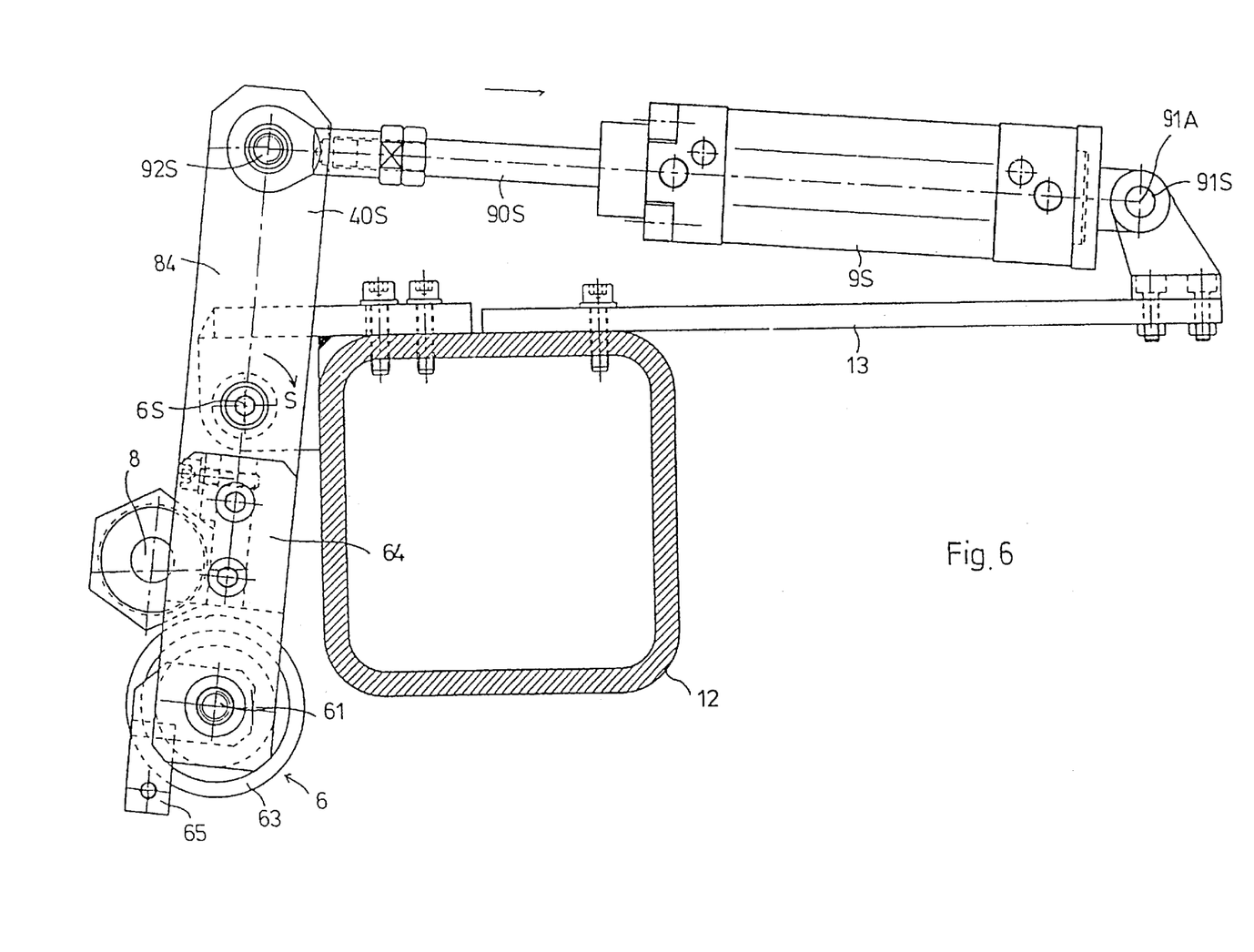
FIG. 6 a side view of the oiling roller from the right according to FIG. 5.

FIGS. 5 and 6 show the pivotable oiling roller (6) with the rectifying shaft (8) associated with its return side, and the pivoting device (9S) that can pivot about the hinge shaft (91A). In contrast to the stationary oiling roller according to FIG. 2a, the lower oiling roller (6) is seated to pivot about a pivoting shaft (6S), which, as a fixed rocker bearing (6S), is held rigidly against a housing carrier (12). A lever (84) is mounted to each end side of the pivoting shaft (6S) and the rectifying shaft (8), with one of the two levers (40S [sic]) being connected by way of a movable rocker bearing (92S) to the pivoting device (9S) so as to rotate. A pneumatic cylinder (9S), which is pivotally seated in a second stationary rocker bearing (91S) at a receptacle (13) for the pivoting cylinder, is used as the pivoting device (9S). This fixed rocker bearing (91S) constitutes the counterbearing (91S) for the other fixed rocker bearing (G2) in the form of the pivoting shaft (6S); the two rocker bearings (91S, 6S) are connected to one another by way of the lever (40S) and the pivoting cylinder (9S) with the piston rod (90S). The pivoting process (PS) of the pivotable oiling roller (6) about the pivoting shaft (6S) is effected with the aid of the pivoting cylinder (9S). In the spaced position (P0), the piston rod (90S) is extended. For pivoting, the piston rod (90S) is retracted, causing the lever (40S) to pivot in the direction of the cutting belts (3) in its fixed joint (6S) forming the pivoting shaft (6S). Then the oiling rollers (6, 7) have assumed the oiling position (P2).

As the roller pivots away, the pivoting cylinder (9S) operates in the reverse direction; in other words, the piston rod is extended, so the lever (40S) rotates about the pivoting shaft (6S) and pivots the oiling roller (6) into the spaced position (P0).

The pivotable oiling roller (6) is constructed similarly to the stationary oiling roller (7), but the connection-side end of the hollow cylinder (62) is provided with a fork (GS) as a second connecting member of the fork-tab connection (GS, 75) of the oiling rollers (6, 7) instead of an oblong-hole tab (75). To couple the two oiling rollers (6, 7), a pin is inserted in the oblong hole (750) of the tab (75) in the fork (75 [sic]), but the two oiling rollers (6, 7) are only coupled in the axial direction during the displacement process (PV). During the pivoting process (PS), the pin is guided in the oblong hole (750), with the ends of the oblong hole (750) forming the stops for the spacing and oiling positions (P0, P2).

The oblong hole (750) and the pin lie in a plane that is oriented virtually perpendicular to the flat cutting belts (3), because the pivotable oiling roller (6) is then guided purposefully about the pivoting shaft (6S) during the pivoting process (PS), and the oiling rollers (6, 7) respectively have an opposing linear contact with the corresponding, facing blade surface (30) of the cutting belts (3). In the oiling position (P2), the rectifying shaft (8) lays the cutting belts (3) flat with respect to the shafts (6A, 7A). Like the oiling rollers (6, 7), the rectifying shaft (8) can be seated to rotate, so it is carried along during oiling by frictional lockup with the cutting belts (3).

Figure 8:
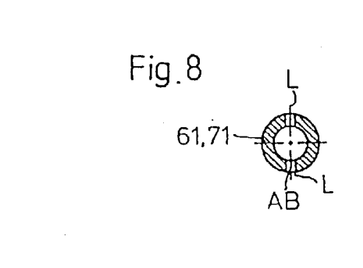
FIG. 8 a cross-section through the hollow shaft according to line B:B in FIG. 7.

FIGS. 7 and 8 show the hollow shaft (61, 71) of the oiling rollers (6, 7). The hollow shaft (61, 71) essentially comprises a tube (610, 710) that has at one end a shoulder (611, 711). This shoulder (611, 711) has an outside thread for connecting the oil lines. The remaining surface of the shoulder (611, 711) is utilized as a sliding surface in the axial-displacement process (PV). The adjoining tube center piece (613, 713) likewise has at one end an outside thread (614, 714) for the knurled nuts (78) and, at the opposite end, a further outside thread (615, 715) for receiving the counternuts (77). A bearing seat (616, 716) is spaced from this outside thread (615, 715) by a stop (617, 717). In the assembled state of the oiling roller (6, 7), the axial bearings (66, 76) are disposed on the bearing seat (616, 716).

Located in the tube center piece (613, 713) are the discharge bores (AB), which are mirror-symmetrical with respect to the center of the shaft and arranged on two opposite lines (L) having parallel axes. The number of discharge bores (AB) decreases from the shaft center toward the shaft ends; the spacing between the individual bores (AB) also increases, with the arrangement of discharge bores (AB) varying on the line (L). Furthermore, the diameter of the discharge bores (AB) decreases from the shaft center toward the shaft ends. The discharge bores (AB) in the shaft center preferably lie opposite one another, and are offset from one another in the outer shaft region. In such an embodiment of the discharge bores (AB) on the hollow shaft (61, 71), the oiling fluid is optimally distributed on the felt jacket (63, 73).

Figure 10:
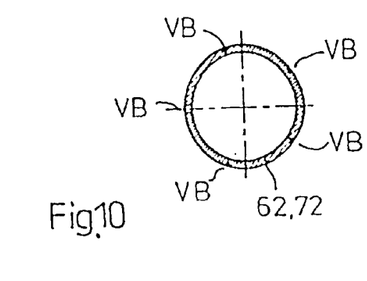
FIG. 10 a cross-section through the hollow cylinder according to line C:C in FIG. 9.

FIGS. 9 and 10 show the hollow cylinder (62, 72), which has the distributor bores (VB) along its circumference. Cut into each end of the hollow cylinder (62, 72) is an inward-oriented shoulder (621, 721) for receiving the axial bearing (66, 76). The distributor bores (VB) are uniformly spaced from one another, and extend along helical lines (SL) on the hollow-cylinder jacket. The pitch height of helical lines (SL) is dimensioned such that the felt jacket (63, 73) is optimally soaked in the region of the most-used cutting belts (3).

What is claimed is:

1. A vertically-operating bread-slicing machine having an oiling comprising, a plurality of cutting belts (3), which are spaced from one another by predetermined bread-slice thicknesses and run endlessly and crossed around two cutting-belt rollers (2), the rollers having on each side of the cutting belts (3) a horizontal oiling roller (6, 7) that oils the blade surfaces (30) of the cutting belts (3) with an oil-soaked felt jacket (63, 73), wherein at least one of the two oiling rollers (6, 7) can pivot about a horizontal pivoting shaft (6S) into a spaced position (P1) with respect to the cutting belts (3), and, in the spaced position (P1) with respect to the cutting belts (3), the two oiling rollers (6, 7) are displaceable, with respect to the cutting belts (3), by a defined length (A) in a longitudinal direction (L) of the rollers;

wherein the oiling rollers (6, 7) are multi-layered in the radial direction, with a rotatably-seated hollow cylinder (72, 72) having distributor bores (VB) and an encasing felt jacket (63, 73) being disposed from the inside toward the outside on a hollow shaft (61, 71) that can be displaced in the longitudinal direction (L) of the rollers and has discharge bores (AB) and oil-line connections at ends thereof.

2. The machine according to claim 1, wherein, during bread slicing, an oiling process of the blade surfaces (30) of the cutting blades (3) is periodically repeated by means of oiling rollers (6, 7) with the pivotable oiling roller (6) being pivoted from a spaced position (PO) with respect to the cutting belts (3), as an initial position (P1), about the horizontal pivoting shaft (6S) and into an oiling position (P2), in which the two oiling rollers (6, 7) lie closely against respective blade surfaces (30) of the cutting blades (3) facing them; then the pivotable oiling roller (6) is pivoted back into the spaced position (P0), and the two oiling rollers (6, 7) are subsequently displaced, with respect to the cutting belts (3), in the longitudinal direction (L) of the rollers into an end position (P3), as the new initial position (P1), which is axially offset from the original initial position (P1).

3. The machine according to claim 2, characterized in that, prior to or following each said oiling process, the oiling rollers 6, 7) are displaced in the longitudinal direction (L) of the rollers by the length (A) corresponding to a width of the blade surface (30) of a cutting belt (3).

4. The machine according to claim 3, characterized in that, in consecutive oiling processes, the oiling rollers (6, 7) are alternatingly pushed back and forth between the initial position (P1) and the end position (P3).

5. The machine according to claim 4, characterized in that the oiling rollers (6, 7) are spaced from the lower cutting-belt roller (2U).

6. The machine according to claim 1, characterized in that the oiling rollers (6, 7) are coupled to one another in an axial roller direction.

7. The machine according to claim 2, characterized in that an oiling roller (6) which engages the inside blade surfaces (30) of the cutting belts (3) is the pivotable oiling roller (6), and an oiling roller (7) which engages the outside blade surfaces (30) of the cutting belts (3) is a stationary oiling roller (7) with respect to the pivoting shaft (6S).

8. The machine according to claim 7, characterized in that a horizontally-oriented rectifying shaft (8) is located downstream of the return side of the pivotable oiling roller (6).

9. The machine according to claim 8, characterized in that the rectifying shaft (8) is coupled with the pivotable oiling roller (6) in a pivoting direction (S).

10. The machine according to claim 9, characterized in that the rectifying shaft (8) comprises steel.

11. The machine according to claim 7, characterized in that a pivoting cylinder (9S) that can pivot about a horizontal hinge shaft (91A) of a fixed rocker bearing moves the pivotable oiling roller (6) back and forth between the spaced position (P0) and the oiling position (P2).

12. The device according to claim 11, characterized in that at least one displacement cylinder (9V) displaces the two oiling rollers (6, 7) in the longitudinal direction (L) of the rollers.

13. The device according to claim 12, characterized in that the displacement cylinder (9V) displaces the stationary oiling roller (7) in the longitudinal direction of the rollers, and, at the same time, displaces the pivotable oiling roller (6) connected thereto via a fork-tab connection (65, 75).

14. The device according to claim 1, characterized in that a number of discharge bores (AB) in the hollow shaft (61, 71) decreases from the center of the shaft toward the shaft ends.

15. The device according to claim 1, characterized in that the discharge bores (AB) are distributed on two opposite lines (L) of the hollow shaft (61, 71) that have parallel axes.

16. The device according to claim 1, characterized in that the discharge bores (AB) of the hollow shaft have a decreasing diameter from the center of the shaft toward the shaft ends.

17. The device according to claim 1, characterized in that the hollow cylinder (62, 72) has distributor bores (VB) disposed uniformly over a cross section thereof.

18. The device according to claim 17, characterized in that the distributor bores (VB) are disposed in at least one helical line (SL) on the hollow cylinder (62, 72) whose pitch height is dimensioned such that the felt jacket is uniformly soaked.

19. The device according to claim 17, characterized in that the distributor bores (VB) are disposed in at least two helical lines (SL) that ascend in opposite directions.

* * * * *